United States Patent

Neumann et al.

[11] Patent Number: 6,058,594
[45] Date of Patent: May 9, 2000

[54] PROCESS FOR MANUFACTURING AN ELECTRIC MOTOR

[75] Inventors: Frank Neumann, Emmenbruecke; Joachim Steffan, Giswil; Jürgen Mayer, Sachseln, all of Switzerland

[73] Assignee: Interelectric AG, Sachseln, Switzerland

[21] Appl. No.: 09/318,687

[22] Filed: May 25, 1999

Related U.S. Application Data

[62] Division of application No. 08/834,860, Apr. 10, 1997, Pat. No. 5,826,452.

[30] Foreign Application Priority Data

Apr. 10, 1996 [DE] Germany ............................ 196 14 217

[51] Int. Cl.[7] .................................................. H02K 15/00
[52] U.S. Cl. .............................. 29/596; 29/598; 29/510; 29/521; 29/736; 29/527.5; 29/527.7; 310/42; 310/43; 310/89; 310/154
[58] Field of Search ............................ 29/596, 598, 510, 29/521, 736, 527.5, 527.7; 310/42, 43, 89, 154

[56] References Cited

U.S. PATENT DOCUMENTS

| | | |
|---|---|---|
| 3,732,616 | 5/1973 | Masrrodonato et al. .................. 29/596 |
| 4,136,294 | 1/1979 | Aubert et al. . |
| 4,309,815 | 1/1982 | Schmitt et al. ........................... 29/596 |
| 4,327,479 | 5/1982 | Futterer et al. . |
| 4,668,887 | 5/1987 | D'Argouges et al. .................. 310/154 |
| 5,201,111 | 4/1993 | Prohaska ................................... 29/596 |
| 5,426,337 | 6/1995 | Kobayashi et al. . |
| 5,731,464 | 3/1998 | Heinze et al. ............................ 310/89 |

FOREIGN PATENT DOCUMENTS

| | | |
|---|---|---|
| L 31 176/21D | 12/1964 | Germany . |
| P.A.-B140342 | 12/1964 | Germany . |
| 1283347 | 11/1968 | Germany . |
| 43 21 027 | 1/1995 | Germany . |
| 51-6533 | 2/1976 | Japan . |
| 55-46859 | 4/1980 | Japan . |
| 55-139067 | 10/1980 | Japan . |
| 59-072972 A2 | 4/1984 | Japan . |
| 60-2056 | 1/1985 | Japan . |
| 62-129259 | 8/1987 | Japan . |
| 576 717 | 6/1976 | Switzerland . |

*Primary Examiner*—Nestor Ramirez
*Assistant Examiner*—Thanh Lam
*Attorney, Agent, or Firm*—Tilton, Fallon, Lungmus & Chestnut

[57] ABSTRACT

The present invention refers to an electric motor comprising a stator with an internal permanent magnet and a tubular magnetic return sleeve surrounding said permanent magnet whereby an annular air gap is formed therebetween, said magnetic return sleeve being held at its axial and radial positions relative to said permanent magnet by a frame of plastic material injected around these two components and being connected to said permanent magnet by said plastic frame. The present invention aims at improving the manner in which the two structural components are attached to and positioned on one another. This is achieved on the basis of the features that said plastic frame extends approximately up to the outer circumference of said magnetic return sleeve, and that one end portion of said magnetic return sleeve has provided therein recesses having each at least two edges which extend towards each other in the direction of the interior of the sleeve, the plastic frame being anchored on said magnetic return sleeve by means of said recesses.

1 Claim, 5 Drawing Sheets

PROCESS FOR MANUFACTURING AN ELECTRIC MOTOR

REFERENCE TO RELATED APPLICATIONS

This application is a Divisional Application of U.S. Patent Application Ser. No. 08/834,860, filed Apr. 10, 1997, now issued as U.S. Pat. No. 5,826,452.

BACKGROUND

1. Field of the Invention

The present invention refers to an electric motor comprising a stator with an internal permanent magnet and a tubular magnetic return sleeve surrounding said permanent magnet whereby an annular air gap is formed therebetween, said magnetic return sleeve being held at its axial and radial positions relative to said permanent magnet by a frame of plastic material injected around these two components and being connected to said permanent magnet by said plastic frame.

2. Description of the Prior Art

Such motors are known as d.c. motors having a permanent magnet and an iron-free rotor. In the prior art, the magnetic return sleeve is connected to the permanent magnet by providing said magnetic return sleeve, which has been produced by turning, with suitable annular grooves or annular webs which can be surrounded by the plastic material by injection moulding. For this purpose, the permanent magnet blank, which has not yet been magnetized, and the magnetic return sleeve are positioned in an injection mould and, subsequently, the connection is established by injecting plastic material which then surrounds these components in the desired manner. On the whole, it proved to be useful to position these components relative to one another and to anchor them on one another in the manner described hereinbefore. Attempts are, however, made to find less expensive solutions in the field of connection technology.

Hence, it is the object of the present invention to provide a d.c. motor of the type described at the beginning, which offers a positioning and anchoring possibility of sufficient stability which is less difficult to produce.

SUMMARY OF THE INVENTION

According to the present invention, this object is achieved by the features that the plastic frame extends approximately up to the outer circumference of said magnetic return sleeve, and that one end portion of said magnetic return sleeve has provided therein recesses having each at least two edges which extend towards each other in the direction of the interior of the sleeve, the plastic frame being anchored on said magnetic return sleeve by means of said recesses. This arrangement offers the advantage that it is now no longer necessary to provide anchoring means on the inner side of the magnetic return sleeve. The shape of the recesses provided with the respective edges that extend towards one another in the direction of the interior guarantees that the plastic material is sufficiently anchored on the magnetic return sleeve. A positive circumstance in this connection is that, when cooling down, the plastic material will shrink, whereby it will so to speak be wedged in position in said recesses; this results in anchoring of extreme geometrical accuracy and stability.

An embodiment which proved to be particularly advantageous is an embodiment in the case of which the magnetic return sleeve is produced from a sheet-metal material by means of a punching operation which is followed by a rolling operation, said magnetic return sleeve being joined along a seam. On the one hand, this has the advantage that this type of method can be carried out very easily and is extremely economy-priced. On the other hand, it will suffice to punch recesses with straight edges out of the flat metal sheet used as a starting material, since the desired tapering arrangement of the respective edges is obtained automatically due to the rolling operation. This permits the use of simple punching tools and no great effort is required for obtaining the desired shape of the recesses. The hitherto employed production of the magnetic return sleeve as a turned part requires the use of a substantial amount of material as well as of high-quality precision machines. The embodiment according to the present variant only requires simple punching and rolling machines and the losses of material entailed by turning operations are avoided.

In order to improve the anchoring of the plastic frame still further, the recesses can also have in the longitudinal direction of the magnetic return sleeve at least two edges which extend towards each other. Also in this case, the shrinking process of the plastic material will have a positive effect insofar as the plastic material will be wedged in position also in the longitudinal direction of the sleeve.

In this connection, the recess can have the shape of a dovetail in accordance with a particularly advantageous embodiment, whereby the plastic frame will be wedged in position axially and radially in the best possible manner by means of one recess shape.

A variant which proved to be particularly stable is the embodiment in the case of which the seam extends in the longitudinal direction of the magnetic return sleeve and is defined by lateral edges of the sheet material which interengage like a puzzle. This type of connection is very stable and does not require a heat treatment in the form of welding or soldering, which might cause changes in the structure of the magnetic return sleeve. In addition, such a seam can very easily compensate a thermal expansion occurring during operation.

In order to obtain an adavantageous positioning of the magnetic return sleeve in the injection mould, said magnetic return sleeve can be provided with a coding recess for aligning the magnetic return sleeve diameter, which belongs to the longitudinal seam, essentially along the easy axis of magnetization of the permanent magnet of the stator. This has the effect that the influence of the longitudinal seam on the magnetic field of the permanent magnet is kept as small as possible, since said longitudinal seam is arranged above a pole, i.e. at a location where the magnetic flux in the magnetic return sleeve divides symmetrically.

A further advantageous embodiment provides the features that, at the end portion of the magnetic return sleeve, the plastic frame has the shape of a disk having, in alignment with the recesses, undercut locking portions which are accessible from outside and which are used for releasably engaging locking elements of additional components, the essentially radial access opening in the area of the recess permitting access to said undercut locking portion so that the components, which are adapted to be be locked in position, can be released. Such a releasable arrangement of additional components offers the decisive advantage that the various components can be attached to a single basic member in a modular mode of construction. Hence, it is easily possible to attach a brush cover or an encoder or a position sensor. This can be done during the assembly operation carried out during production or, according to the customer's wishes, in an exchange operation carried out later on.

In accordance with an advantageous embodiment, the disk can be provided with centering means for components to be attached, whereby a certain amount of play in the locking means is compensated for and whereby the components to be attached will be arranged at the correct positions.

Especially when the magnetic return sleeve is produced by means of a rolling operation, only materials of limited thickness can be used. In accordance with one embodiment, the iron volume is enlarged by an additional sleeve which is inserted in the magnetic return sleeve in an essentially tight-fitting manner so as to increase the magnetic return effect. This sleeve is normally pressed into the magnetic return sleeve and it can additionally have a longitudinal slot whose associated additional sleeve diameter essentially coincides with the magnetic return sleeve diameter $D_H$.

DESCRIPTION OF SEVERAL VIEWS OF DRAWINGS

In the following, one embodiment of the present invention will be explained in detail on the basis of a drawing, in which:

FIG. 1 shows a sectional view of a stator of a d.c. motor according to the present invention, FIG. 2 shows a side view of the stator of FIG. 1, FIG. 3 shows a perspective view of the magnetic return sleeve according to FIG. 1, FIG. 4 shows a schematic top view of the magnetic return sleeve according to FIG. 3, FIG. 5 shows a side view of a detail of the end portion provided with the recesses of the sleeve according to FIG. 4, FIG. 6 shows a scaled-up half-sectional view of the stator with rotor shaft and attached component, and FIG. 7 shows a scaled-down side view from the right showing the attached component according to FIG. 6.

DETAILED DESCRIPTION OF THE PREFERRED EMBODIMENTS

Figure 2:
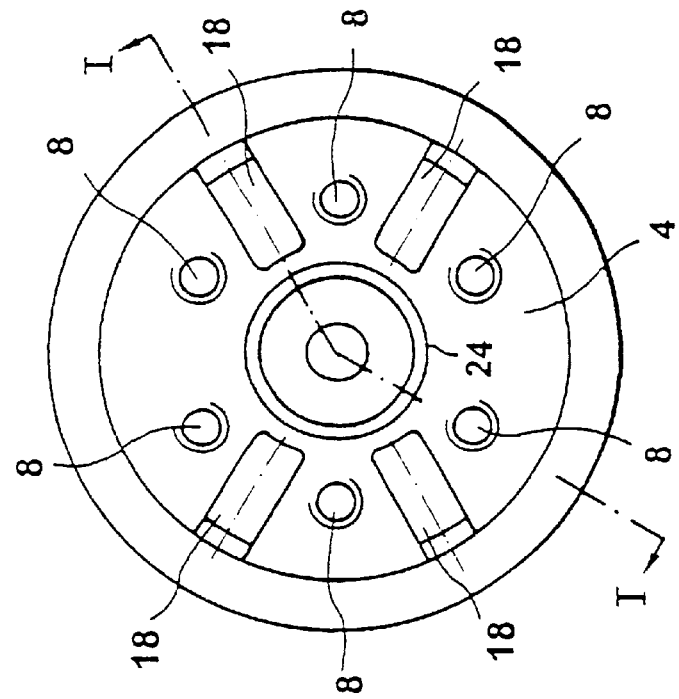
Figure 1:
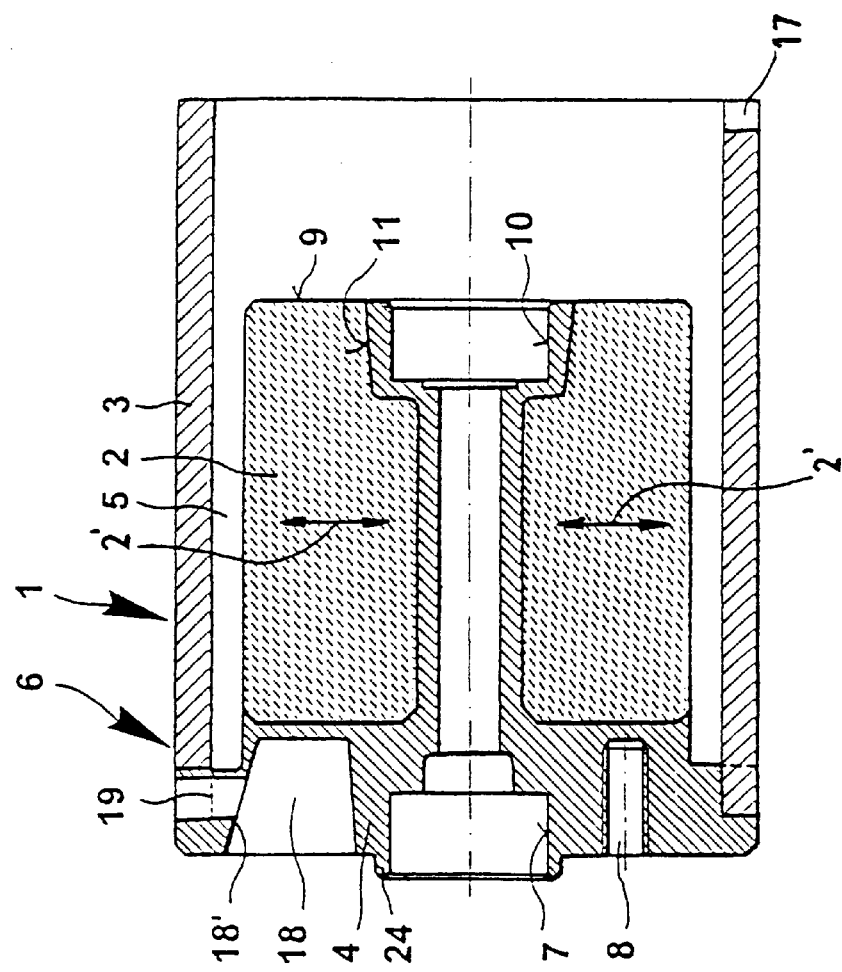

The stator 1, which is shown in FIG. 1, essentially comprises an annular permanent magnet 2 having an easy axis of magnetization 2', a tubular magnetic return sleeve 3 surrounding said permanent magnet 2, and a frame 4 of plastic material injected around these two components, said frame 4 positioning these two components relative to one another and interconnecting them.

Between the permanent magnet 2 and the magnetic return sleeve 3 an air gap 5 is formed in which an iron-free rotor winding is positioned, said rotor winding being not shown.

At one end portion 6 of the magnetic return sleeve 3, the plastic frame 4 has the shape of a disk having arranged therein a bearing reception means 7 and a plurality of tapped holes 8 as well as means which will be described in detail hereinbelow. The plastic frame 4 extends more deeply into the bore of the permanent magnet 2 and forms at the opposite end 9 of said permanent magnet a further bearing reception means 10 within an enlarged portion 11 of the bore in the permanent magnet 2. On the basis of this shape, the plastic frame 4 guarantees that the permanent magnet 2 is reliably held relative to the magnetic return sleeve 3.

Figure 3:
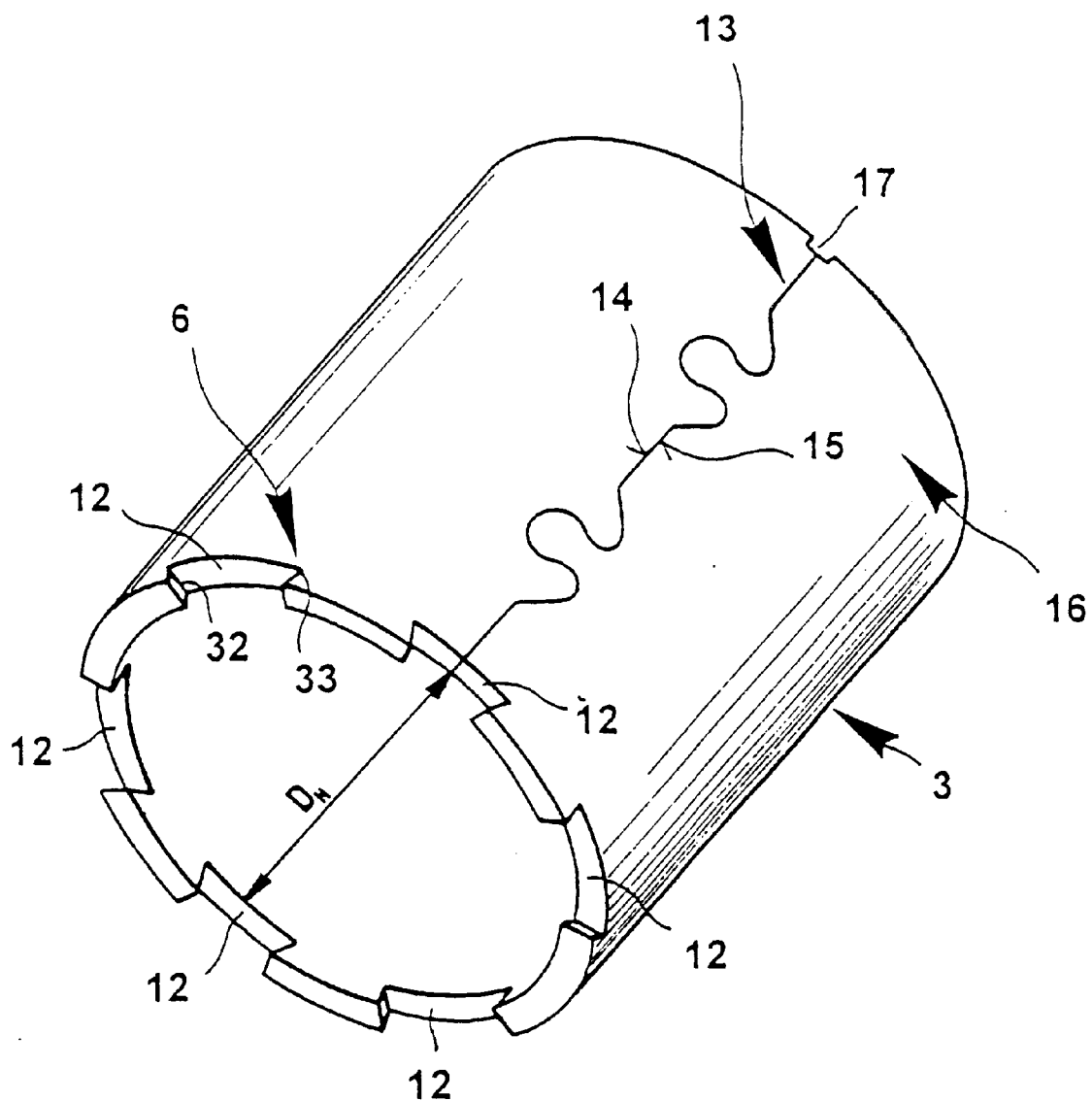
Figure 4:
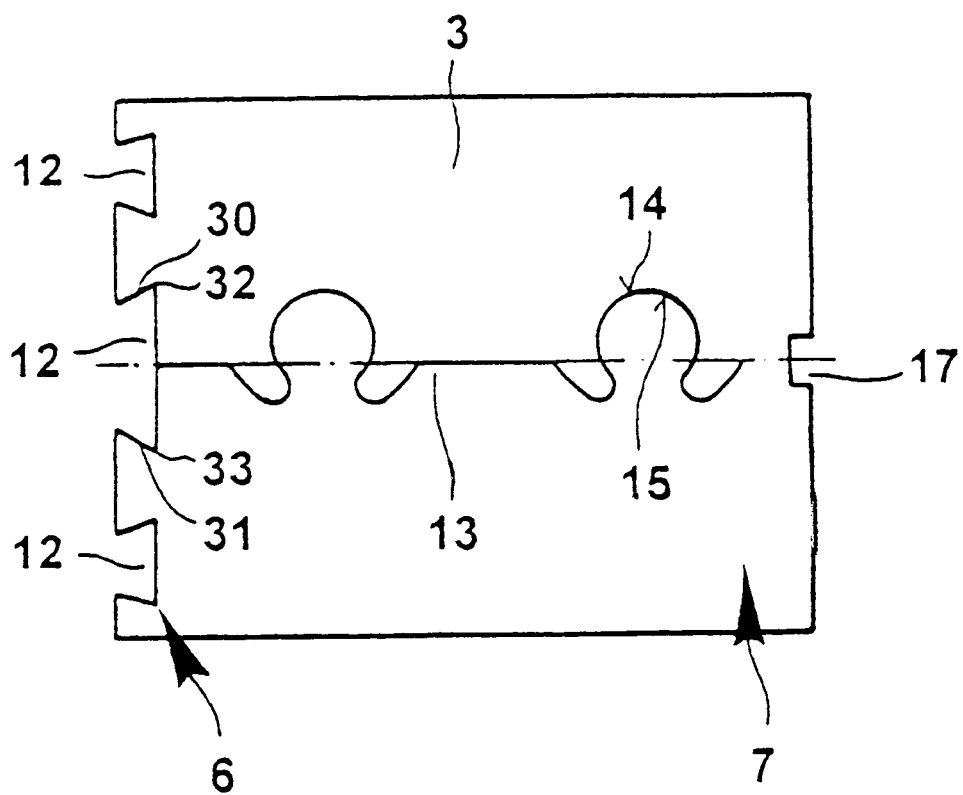

As can especially be seen with the aid of FIG. 3, the plastic frame 4 is anchored on the magnetic return sleeve 3 via a plurality of dovetailed recesses 12 arranged on said end portion 6. The short side of the dovetailed recess 12 defines the opening facing outwards so that the plastic frame 4 is anchored in the longitudinal direction of the sleeve 3. In addition, said magnetic return sleeve 3 has a longitudinal seam 13 with an associated sleeve diameter $D_H$ of such a nature that the two end faces 14, 15 defining said longitudinal seam interengage like a puzzle. This prevents an axial as well as a tangential displacement of said end faces 14, 15. The end portion 16 of the magnetic return sleeve 3 located opposite said recesses 12 has provided therein a coding recess 17 which serves to position the sleeve 3 precisely relative to the permanent magnet 2 within an injection mould.

Figure 6:
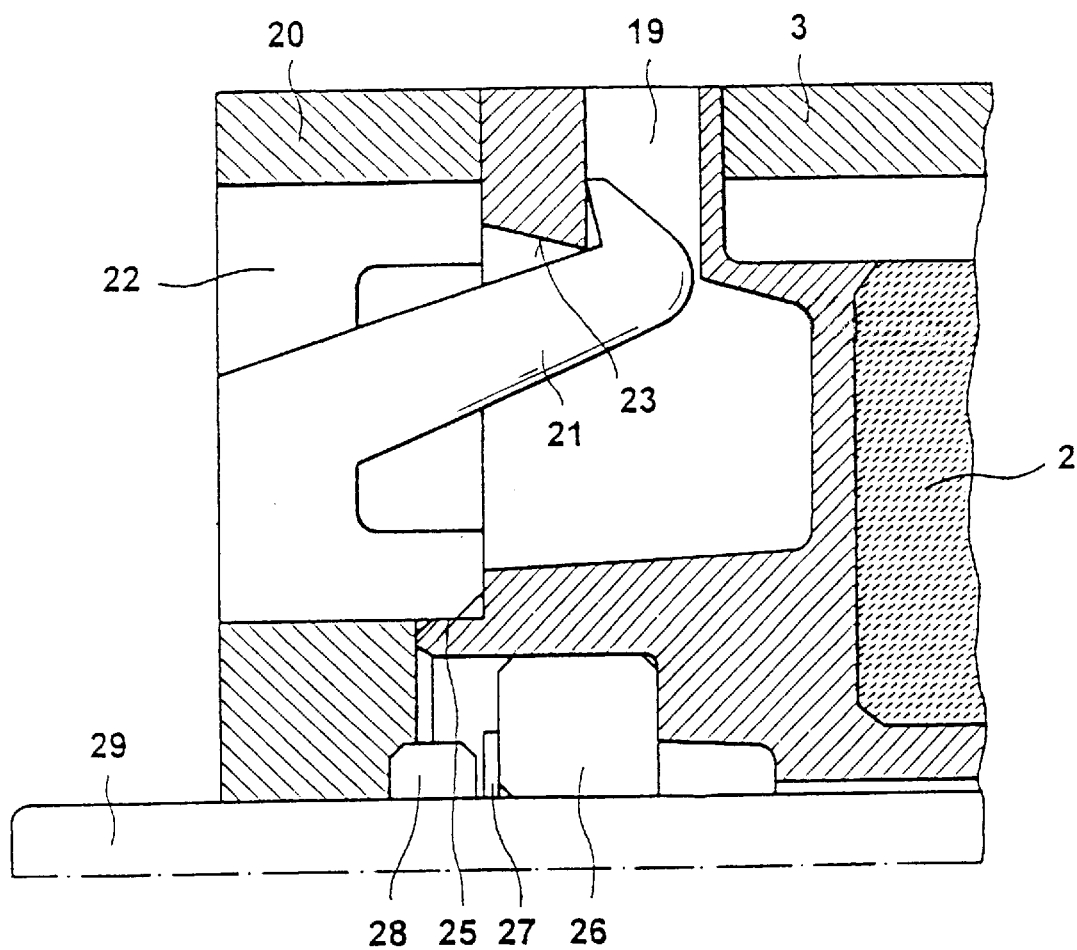
Figure 7:
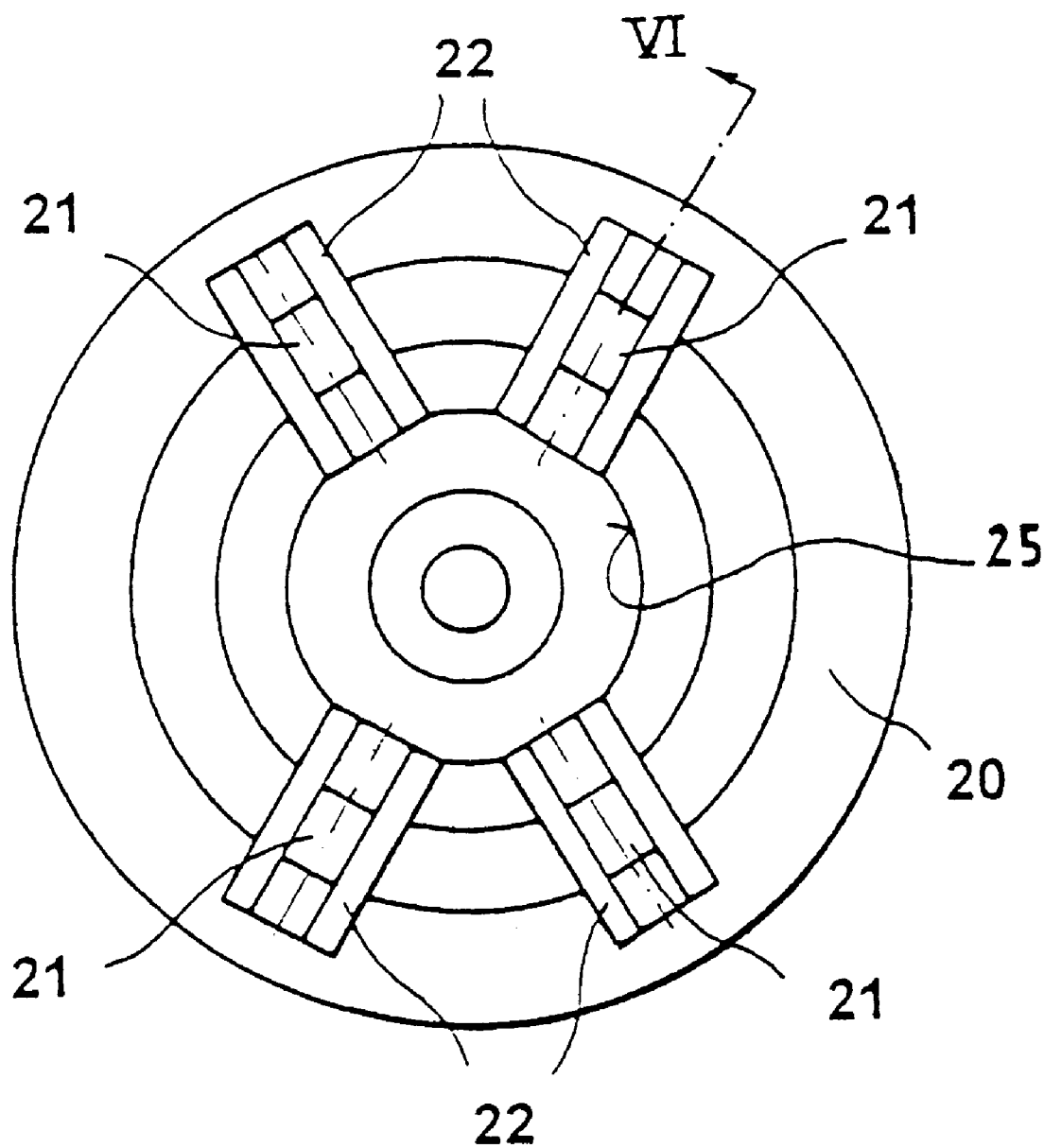

The disk of the plastic frame 4 is additionally provided with four pocket-shaped locking apertures 18 which are accessible from outside and which, for forming an undercut locking portion 18', communicate with access openings 19 extending radially into the recess 12. In particular FIG. 6 shows how an additional component 20, e.g. a brush cover or an encoder or a position sensor etc., can be secured in position in said locking apertures 18 with the aid of suitable locking means 21. The hook-shaped locking elements 21 are resiliently arranged in recesses 22 of said component 20 so that, when they are being attached to the plastic frame 4, they will be pressed downwards by the bevel 23 until they succeed in engaging the access opening 19 behind said undercut locking portion 18'.

The plastic frame 4 has additionally provided thereon a centering projection 24 which is used for centering the components 20 to be attached and which engages complementary centering reception means 25 provided on said components 20.

FIG. 6 also shows a schematic representation of a bearing 26 arranged in the bearing reception means 7, a retainer ring 27 and a sealing means 28 as well as a motor shaft 29 passing through all these components.

In the following, the mode of action and the mode of functioning of the embodiment described hereinbefore will be explained in detail.

In the case of the embodiment shown in the present connection, the magnetic return sleeve 3 is produced from a sheet-metal material by means of punching and rolling operations. For this purpose, the flat sheet metal is punched in a suitable manner so that the recesses 12 and the respective end faces 14, 15 as well as the coding recess 17 are formed.

Figure 5:
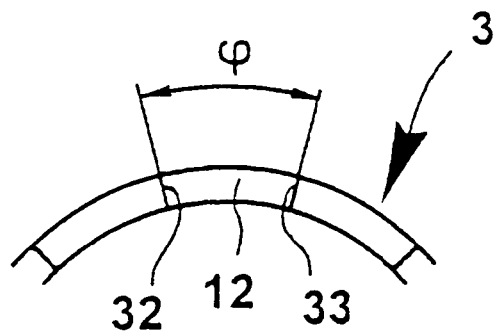

Due to their dovetail shape, the recesses 12 each have an edge 30 and an edge 31 which extend towards each other in the longitudinal direction. The edges 32 and 33 of said recesses 12 extend parallel to one another as long as the sheet-metal material has not yet been rolled. Due to the rolling operation, which results in the tubular shape and in the course of which the end faces 14, 15 are combined so as to form the longitudinal seam 13, different changes in the length of the material in the radial direction are caused so that the previously parallel edges 32, 33 now also extend toward each other in the direction of the interior of the magnetic return sleeve 3. This can be seen in a particularly clear manner on the basis of FIG. 5. It follows that said edges 32, 33 form an angle $\phi$, which essentially depends on the rolled radius of the magnetic return sleeve 3 so that for the material of the plastic frame 4 arranged within the recesses 12 an undercut portion is also formed in the radial direction.

After the rolling operation, the magnetic return sleeve 3 and the permanent magnet blank 2, which has not yet been magnetized, are introduced in an injection mould and positioned relative to one another especially by means of the coding recess 17 so that the longitudinal seam 13 is arranged above a future magnetic pole of said permanent magnet 2.

The injection mould has now injected therein the plastic material for forming the plastic frame 4, and said plastic material is allowed to cure. Due to the fact that the hot plastic material shrinks, the amount of material arranged in the recesses 12 is fixedly wedged in position in said recesses because the respective edges 30, 31, 32 and 33 are inclined in a direction opposite to the direction of shrinking. Also the permanent magnet 2 is fixed relative to the plastic frame 4 due to the shape of said plastic frame 4 resulting from the shrinking process.

Following this, the permanent magnet 2 is magnetized, said coding recess 17 being used for alinging the stator 1 in a suitable manner relative to the permanent magnet 2.

Reference is again made to the fact that the formation of the plastic frame 4 additionally offers the space-saving possibility of releasably arranging additional components 20 on the stator precisley at the desired position with the aid of the centering projection 24 and the centering reception means 25. If, for example, a component 20 which has once been secured to the stator 1 is to be removed again, a suitable tool will be introduced in the access opening 19 until the locking elements 21 are out of engagement with the undercut locking portions 18'. Subsequently, said component 20 can be removed and, if desired, be replaced by a new one. Hence, this arrangement provides the possibility of arranging such attachment members directly on the magnetic return sleeve 3. In addition, also the tapped holes 8 can be used for fastening additional components.

It is intended that the foregoing description be only illustrative of the present invention and that the present invention be limited only by the hereinafter appended claims.

We claim:

1. A process for manufacturing an electric motor comprising the steps of:

punching recesses having at least two parallel edges out of a flat metal sheet;

rolling of the metal sheet to form a magnetic return sleeve, thereby changing the orientation of at least two edges of said recesses, so that said edges extend toward each other in a direction of the interior of the sleeve and the recesses are positioned at one end portion of the magnetic return sleeve; and injection molding a plastic frame to connect said magnetic return sleeve with a permanent magnet, whereby said plastic frame is anchored on said magnetic return sleeve by means of the recesses.

* * * * *

UNITED STATES PATENT AND TRADEMARK OFFICE
CERTIFICATE OF CORRECTION

PATENT NO. : 6,058,594
DATED : May 9, 2000
INVENTOR(S) : Neumann et al.

It is certified that error appears in the above-indentified patent and that said Letters Patent is hereby corrected as shown below:

On the Title Page, under Related U.S. Application Data, the sentence should read:

-- Division of application No. 08/834,760, April 3, 1997, Pat. No. 5,942,827. --

Signed and Sealed this

Seventeenth Day of April, 2001

Attest:

NICHOLAS P. GODICI

Attesting Officer     Acting Director of the United States Patent and Trademark Office